US005956042A

United States Patent [19]
Tucker et al.

[11] Patent Number: 5,956,042
[45] Date of Patent: Sep. 21, 1999

[54] GRAPHICS ACCELERATOR WITH IMPROVED LIGHTING PROCESSOR

[75] Inventors: S Paul Tucker; Alan S. Krech, Jr., both of Fort Collins, Colo.

[73] Assignee: Hewlett-Packard Co., Palo Alto, Calif.

[21] Appl. No.: 08/846,364

[22] Filed: Apr. 30, 1997

[51] Int. Cl.⁶ ................................................. G06F 15/00
[52] U.S. Cl. ............................................................ 345/426
[58] Field of Search .................................. 345/426, 425, 345/419, 428, 429, 431

[56] References Cited

U.S. PATENT DOCUMENTS

| | | | |
|---|---|---|---|
| 4,988,981 | 1/1991 | Zimmerman et al. | 340/709 |
| 5,524,187 | 6/1996 | Feiner et al. | 345/419 |
| 5,528,735 | 6/1996 | Sirasnick et al. | 395/127 |

*Primary Examiner*—Phu K. Nguyen

[57] ABSTRACT

A system and method computes the color of a plurality of vertices of one or more graphic primitives in a graphics accelerator. The method includes the steps of receiving lighting properties of a primitive vertex and determining whether predetermined lighting properties of the vertex are the same as a previously computed vertex. If predetermined lighting properties are the same as the previously computed vertex, then the method retrieves at least one preprocessed value from a storage location; and utilizes the at least one preprocessed value to compute the vertex color. If, however, the predetermined lighting properties are not the same as the previously computed vertex, then the method computes at least one preprocessed value from the received lighting properties of the primitive vertex, stores the at least one computed preprocessed value in a storage location, and utilizes the at least one preprocessed value to compute the vertex color. The system includes at least one processing unit (e.g., ALU) for performing mathematical operations on lighting properties of a vertex of a graphics primitive. It also includes a storage area for storing predetermined values processed by the processing unit. A receiver is included and configured to receive at least two lighting properties defining a primitive vertex, and a lighting property comparator is configured to compare the at least two lighting properties with previously received lighting properties to determine whether they are the same. Finally a controller is provided and adapted to control the storage and retrieval of values from the storage area and the processing unit, the controller including storage control means responsive to the lighting property comparator configured to save newly processed vertex color values in the operational storage register and to retrieve preprocessed values from the storage area.

20 Claims, 5 Drawing Sheets

GRAPHICS ACCELERATOR WITH IMPROVED LIGHTING PROCESSOR

BACKGROUND OF THE INVENTION

1. Field of the Invention

The present invention relates to computer graphics systems and, more particularly, to a computer graphics system utilizing a graphics accelerator having an enhanced logic and register structure to achieve enhanced performance.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and α) color values of each vertex. Alpha is a transparency value. Additional primitive data may be used in specific applications. Rendering hardware interpolates the primitive data to compute the display screen pixels that represent each primitive, and the R, G, B and α values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. The data for a single quadrilateral may be on the order of, for example, 64 words of 32 bits each. Additional data transmitted from the host computer to the geometry accelerator includes illumination parameters, clipping parameters and any other parameters needed to generate the graphics display.

Various techniques have been employed to improve the performance of geometry accelerators. These including pipelining, parallel processing, reducing redundancy, minimizing computations, etc. in a graphics accelerator. For example, conventional graphic systems are known to distribute the vertex data to the geometry accelerators in a manner that results in a non-uniform loading of the geometry accelerators. This variability in geometry accelerator utilization results in periods of time when one or more geometry accelerators are not processing vertex data when they are capable of doing so. Since the throughput of the graphics system is dependent upon the efficiency of the geometry accelerators, this inefficient use of the processing capabilities decreases the efficiency of the graphics system. In response to this shortcoming in the prior art, a solution was developed for distributing "chunks" of data to a parallel arrangement of geometry accelerators.

Another way of improving the throughput of a geometry accelerator is to minimize the overall amount of data that must be processed by it. For example, this can be done by minimizing redundancy in the data being sent to the geometry accelerator. While these and other techniques are known for improving the performance of geometry accelerators, further improvements are desired.

For instance, another shortcoming of the prior art systems relates to the processing time and intensity of the lighting calculations. As is known, the color of each primitive vertex is calculated based upon a number of lighting parameters. These parameters include the color and type of lighting from each light source, the color and lighting properties of the vertex material, the position of the material with respect to the light source(s), etc. These calculations are required for each vertex and include computations for red, green, and blue (RGB) components attributable to each lighting parameter. These calculations are both time and resource intensive.

Accordingly, it is desired to provide a system that simplifies or reduces these calculations, without sacrificing the resulting image quality.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for computing the color of a plurality of vertices of one or more graphic primitives in a graphics accelerator. In accordance with one aspect of the invention, the method includes the steps of receiving lighting properties of a primitive vertex and determining whether predetermined lighting properties of the vertex are the same as a previously computed vertex. If predetermined lighting properties are the same as the previously computed vertex, then the method retrieves at least one preprocessed value from a storage location, and utilizes the at least one preprocessed value to compute the vertex color. If, however, the predetermined lighting properties are not the same as the previously computed vertex, then the method computes at least one preprocessed value from the received lighting properties of the primitive vertex, stores the at least one computed preprocessed value in a storage location, and utilizes the at least one computed value to compute the vertex color.

In accordance with the preferred method, the lighting properties mentioned above may include material emission color, material ambient color, material diffuse color, material specular color, lighting ambient color, lighting diffuse color, and/or lighting specular color. Furthermore, the method computes the red, green, and blue components of the one or more selected properties, utilizing the following equation:

$$vertexcolor = (Me + Ga * Ma) + \Sigma^n(Sf_1)*(Ma*La + Sf_2*Md*Ld + Sf_3*Ms*Ls);$$

wherein Me is a material emissivity, Ga is a global ambient, Ma is a material ambient component, La is a lighting ambient component, Md is a material diffuse component, Ld is a lighting diffuse component, Ms is a material specular component, Ls is a lighting specular component, n is the number of light sources, and $Sf_1$, $Sf_2$, and $Sf_3$ are scale factors.

In accordance with another aspect of the present invention, a system is provided for increasing speed in a geometry accelerator for a computer graphics system. This system includes at least one processing unit (e.g., ALU) for performing mathematical operations on lighting properties of a vertex of a graphics primitive. It also includes a storage area for storing predetermined values processed by the processing unit. A receiving means is included and configured to receive at least two lighting properties defining a primitive vertex, and a lighting property comparator is configured to compare the at least two lighting properties with previously received lighting properties to determine whether they are the same. Finally a controller is provided and adapted to control the storage and retrieval of values from the storage area and the processing unit, the controller including storage control means responsive to the lighting property comparator configured to save newly processed vertex color values in the operational storage register and to retrieve preprocessed values from the storage area.

In accordance with the preferred embodiment, the system utilizes one or more status registers for indicating whether new values must be processed or whether previously stored, preprocessed values may be retrieved from memory. Preferably, each status register is a thirty two bit register and stores information for each primitive vertex for both front facing and back facing surfaces. It will be understood that a single status register may be provided, or alternatively a separate status register may be provided for each light source.

DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated by the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
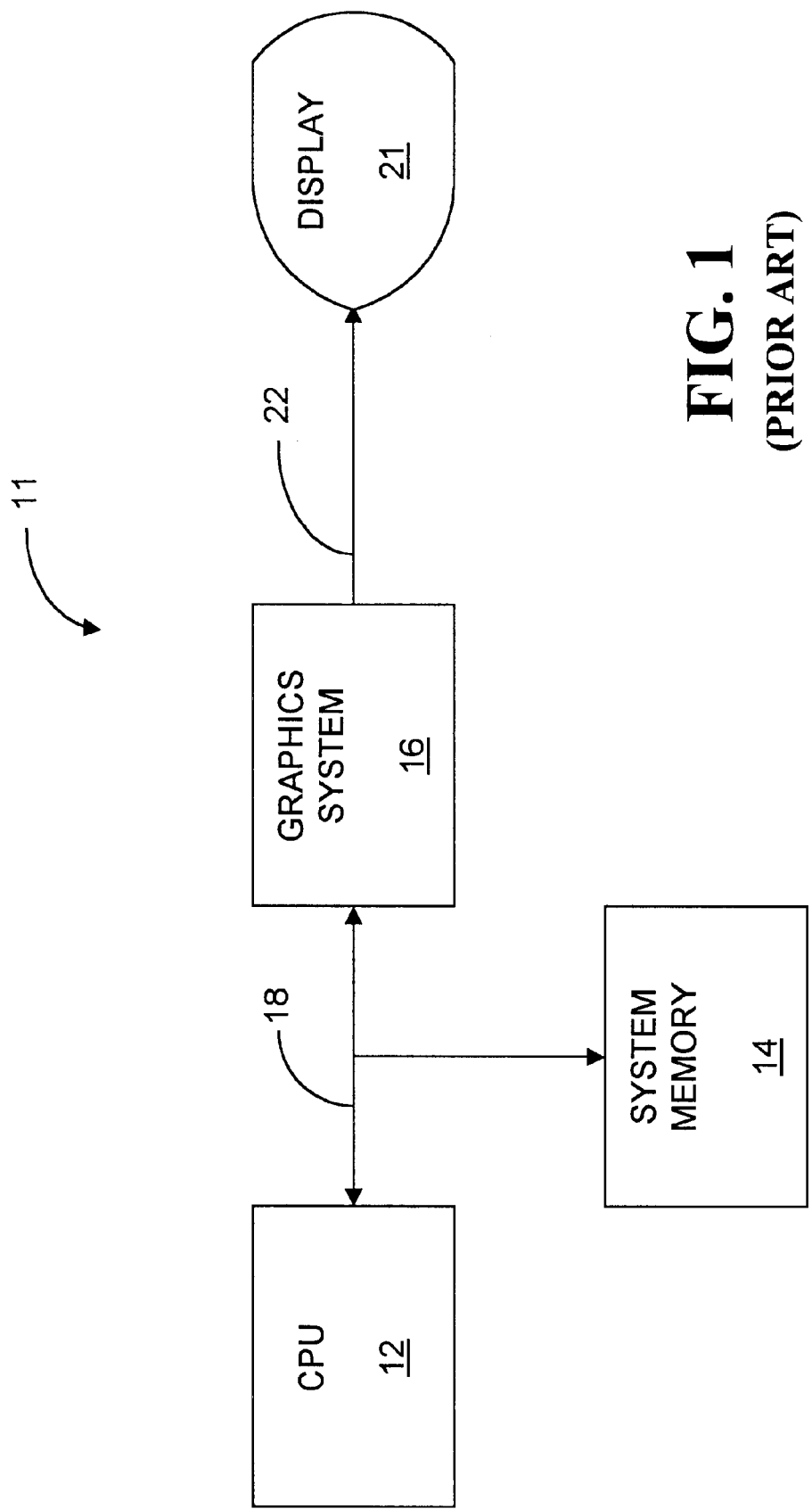
FIG. 1 illustrates a block diagram of a computer graphics system in accordance with the prior art.
Figure 2:
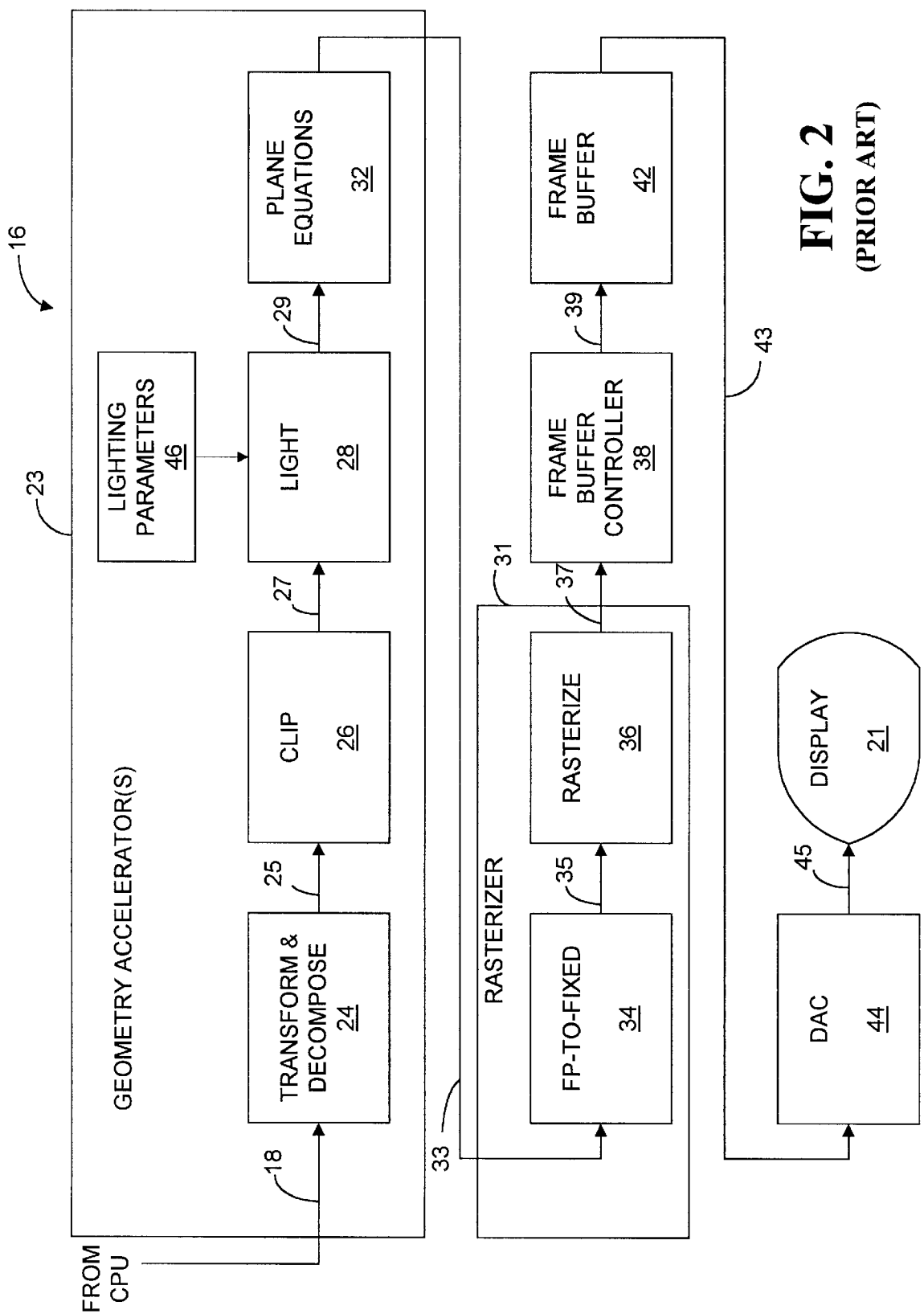
FIG. 2 illustrates a block diagram of a geometry accelerator and rasterizer of a computer graphics system in accordance with the prior art.

The basic components of a conventional computer graphics display system are shown in FIGS. 1 and 2. The computer graphics display system 16 comprises a geometry accelerator 23, a rasterizer 31, a frame buffer controller 38, and a frame buffer 42. The computer graphics display system 16 may also include texture mapping hardware (not shown). The geometry accelerator 23 receives vertex data from the host CPU 12 that defines the primitives (e.g., triangles) that make up the image to be displayed on the display 21.

The geometry accelerator 23 typically includes a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. Generally, all other vertex data is tossed or ignored. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the user relative to the object being displayed. This information is introduced to the lighting machine 28 through lighting parameters 46. While the lighting parameters 46 is illustrated as a separate block, it will be appreciated that this block is preferably implemented by a section of memory dedicated to storing the various lighting parameters (discussed below). The system CPU 12, through software, ultimately conveys the data for these parameters to the graphics accelerator 23 and its memory.

The plane equations component 32 generates floating point equations which define the image space within the vertices on the display screen. That is, the plane equations component 32 determines how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

As stated above, the operations of the geometry accelerator are computationally very intense because of the large volume of data transferred between the host computer and the geometry accelerator and because of the fact the geometry accelerator normally is required to perform several hundred million floating point calculations per second. In accordance with the present invention, it has been determined that the throughput of the computer graphics display system can be improved by reducing the number of mathematical operations that are normally executed in computing the lighting equation. More specifically, it has been determined that the throughput of the computer graphics display system can be improved by eliminating redundancy in the lighting equation calculations processed by the lighting machine 28.

Since the present invention provides a more efficient graphics accelerator 23 by improving the computations performed by the lighting machine 28, the discussion hereinafter will focus on this portion of the system, and those skilled in the art will appreciate that the other system components may operate in accordance with ways that are well known. In this regard, the lighting machine 28 of the geometry accelerator 23 receives red, green, blue, and alpha (R, G, B and α) data, X, Y, and Z data, and $N_x$, $N_y$ and $N_z$ data (orientation data) for each primitive received by the lighting machine. The lighting machine also receives light model material parameters and light source parameters, which are collectively referred to below as lighting parameters or lighting properties. These parameters may be broadly categorized into model material parameters and light source parameters. As will be discussed more fully below, the light model material parameters specify the material of which the model is comprised. The light source parameters specify the location of the light source in 3-D space with respect to the model and the direction of the light. The lighting machine processes all of this data and generates R, G and B color data for each vertex.

In order to support two-sided lighting (i.e., front and back) of models being displayed, the illumination component receives two sets of light model parameters, one for the front-facing primitives and one for the back-facing primitives. Generally, each set of model parameters includes parameters which describe how the material reflects ambient light, diffuse light, and specular light, as well as how the material emits light. Conventional computer graphics display systems require a new set of light model parameters to be sent to the illumination component, along with the R, G, B, and α (α being a transparency indicator) data, the X, Y, and Z data, the $N_x$, $N_y$ and $N_z$ (orientation) data, and S,T,R, and Q (texture coordinates) data, which defines the vertices of the primitive, whenever the primitive being received by the illumination component is facing in a different direction from the previous primitive.

As is known, lighting is an extremely important aspect in computer graphics and imaging. Indeed, it is lighting that gives otherwise two dimensional objects a three dimensional appearance. For example, a circle drawn on a computer screen has a two dimensional appearance. But when the appropriate shading is added to the circle, it takes on the three dimensional, spherical appearance. In computer graphics, an image is displayed by controlling the color of a large number of pixels that make up the display. Lighting properties factor prominently into the determination of the various pixel colors. By way of introduction, computer graphics generally operate to approximate light and lighting conditions by breaking light up into red, green, and blue components. Thus, the color of light sources is characterized by the amount of red, green, and blue light. Likewise, the color of surface materials is characterized by the amount of incoming red, green, and blue components that are reflected in various directions. If all real-world considerations were factored into this process, the computations would be intense, and for all practical purposes, unworkable. However, the lighting equations (discussed below) provides a very workable approximation. It will be appreciated that the lighting equation provided below is implemented in hardware. If a different, or more precise solution is desired, such a solution must be processed or computed in software.

In the lighting model of the present invention, the light in a particular scene is derived from several light sources that may be individually turned on and off. Some light may come from a particular direction or position, and other light is generally scattered about the scene. For example, if a particular scene is of a room, and a light bulb in that scene is turned on, most of the light in the scene comes from the light bulb, after being reflected off of one, two, or more objects or walls. This reflected light is called ambient light, and is assumed to be so scattered that there is no practical way to tell its original direction. It, nevertheless, disappears if a particular light source is turned off. In addition, there may be a general ambient light present in a scene that comes from no particular source.

In the lighting model of the present invention, light sources have an effect on objects, only when an object's surface absorbs or reflects light. In this regard, an object is assumed to be composed of material with various properties. A material may emit its own light (for example a light bulb), it may scatter some incoming light in all reflections (diffuse component), and it may reflect some portion of incoming light in a particular direction (specular component). With these general considerations in mind, the lighting model of the present invention approximates lighting in a scene to comprise four independent components: emitted, ambient, diffuse, and specular. As will be described below, all four components factor into the lighting equations, which determines the lighting of a particular pixel or primitive vertex.

Emitted light is the simplest of the four independent components. It originates from an object and is unaffected by any light sources. As mentioned above, the ambient component is the light from a source that has been scattered so much by the environment that its direction is impossible or impractical to determine. For instance, back lighting in a room has a significant ambient component, since most of that light has been reflected off of many surfaces. In contrast, an outdoor or unbounded spotlight has a very small ambient component, since most of the light travels in one direction and is unreflected off of other surfaces. When ambient light strikes a surface, it is generally assumed to be scattered equally in all directions. Diffuse light originates from a single direction, so it appears brighter, if it comes squarely down on a surface, than if it barely glances off the surface. Once it contacts a surface, it scatters equally in all directions, with equal luminous intensity. Any light source coming from a particular direction or position typically has a diffused component. Finally, specular lighting comes from a particular direction and tends to reflect off of an objects surface in a certain predetermined direction. For example, a sharply focused light, such as a laser, reflecting off a smooth metal surface will have a high specular component.

Material and lighting colors also have a strong effect on the lighting appearance of objects. As has been previously mentioned, the lighting model of the present invention breaks light sources into their red, green, and blue components. However, as a general matter, it will be understood that a red light, for example, reflecting off a white object will tend to make the white object appear red. The lighting model of the present invention makes the approximation that a material's color depends upon the percentage of incoming red, green, and blue light that it reflects. Similarly, object materials have differing ambient, diffused, and specular color components, which in turn determine the ambient, diffuse, and specular reflectance of the material. In accordance with the lighting equation of the present invention, a material's ambient reflectance is combined with the ambient component of each incoming light source. In similar fashion, the diffuse reflectance is combined with the diffuse component of each incoming light source, and the specular reflectance is combined with the specular reflectance of the specular component of each incoming light source.

A final introductory note relates to the position and attenuation of the light sources. A light source may be near to a scene or infinitely far away from a scene. The effect of an infinite light source location is that the rays of the light can be considered or treated as parallel by the time they reach an object. Such a light source may be called a directional. A light source may also be defined to be positional. For example, a spotlight having a focused beam is defined not only by its position in relation to objects within a scene, but also its direction. Having provided this general introduction, which will be readily understood by those skilled in the art, reference is now made in more detail to the particular lighting equation implemented in the preferred embodiment of the present invention. This lighting equation is set forth as follows:

$$vertexcolor=(Me+Ga*Ma)+\Sigma^n(Sf_1)*(Ma*La+Sf_2*Md*Ld+Sf_3*Ms*Ls);$$

wherein Me is a material emissivity, Ga is a global ambient, Ma is a material ambient component, La is a lighting ambient component, Md is a material diffuse component, Ld is a lighting diffuse component, Ms is a material specular component, Ls is a lighting specular component, n is the number of light sources, and $Sf_1$, $Sf_2$, and $Sf_3$ are scale factors.

In light of the foregoing equation, it is appreciated that a given vertex's color is determined by combining the various ambient, diffuse, and specular components of the material and lighting associated at that vertex. In this regard, the material ambient component is multiplied by the lighting ambient component (each of the red, green, and blue values), the material's diffuse component and the lighting diffuse component are multiplied, and the material's specular component is multiplied by the light's specular components. Each of these individual product terms are summed, and the summation is multiplied by a first scale factor $Sf_1$. This scale factor is, in essence, a measure of luminous intensity, and attenuates as the distance between the light source and point of illumination. More specifically, the first scale factor $SF_1$ is defined by the quadratic:

$$Sf_1=1/(kc+kl*d+kq*d^2)*(\text{Spotlight effect})$$

where d=the distance between the light's position and the vertex;

kc=a constant attenuation factor;

kl=a linear attenuation factor; and kq=a quadratic attenuation factor.

Spotlight effect evaluates to one of three possible values, depending on whether the light is actually a spotlight and whether the vertex lies inside or outside the cone of illumination produced by the spotlight. These three possible values are: 1, if the light is not a spotlight, 0, if the light is a spotlight but the vertex lies outside the cone of illumination produced by the spotlight; and $(\max\{v\cdot d, 0\})^{exponent}$. In this term, $v=(v_x, v_y, v_z)$ is the unit vector that points from the spotlight to the vertex, and $d=(d_x, d_y, d_z)$ is the spotlight's direction, assuming the light is a spotlight and the vertex lies inside the cone of the illumination produced by the spotlight. The dot product of the two vectors v and d varies as the cosine of the angle between them (See FIGS. 6A and 6B). Therefore, objects directly in line get maximum illumination, while objects off the axis have their illumination attenuate as the cosine of the angle.

The diffuse term (Md*Ld) and the specular term (Ms*Ls) are also weighted by scale factors $Sf_2$ and $Sf_3$. The diffuse term takes into account whether light falls directly on the vertex, the diffuse color of the light, and the diffuse material property. As a result, $Sf_2$ is defined as $\max\{l\cdot n, 0\}$, where $l=(l_x, l_y, l_z)$ is the unit vector that points from the vertex to the light position, and $n=(n_x, n_y, n_z)$ is the unit normal vector at the vertex. Similarly, the specular term also depends on whether light falls directly on the vertex. If l·n is less than or equal to zero, there is no specular component at the vertex. If however, there is a specular component, the scale factor $Sf_3$ is calculated as follows:

$$Sf_3=(\max\{s\cdot n\})^{shininess},$$

where $s=(s_x, s_y, s_z)$ is generally derived from the sum of two vectors that point between (1) the vertex and the light position and (2) the vertex and the viewpoint, and n is the unit normal vector defined above. Shininess is a value/attribute defining a material's shininess.

Figure 6A:
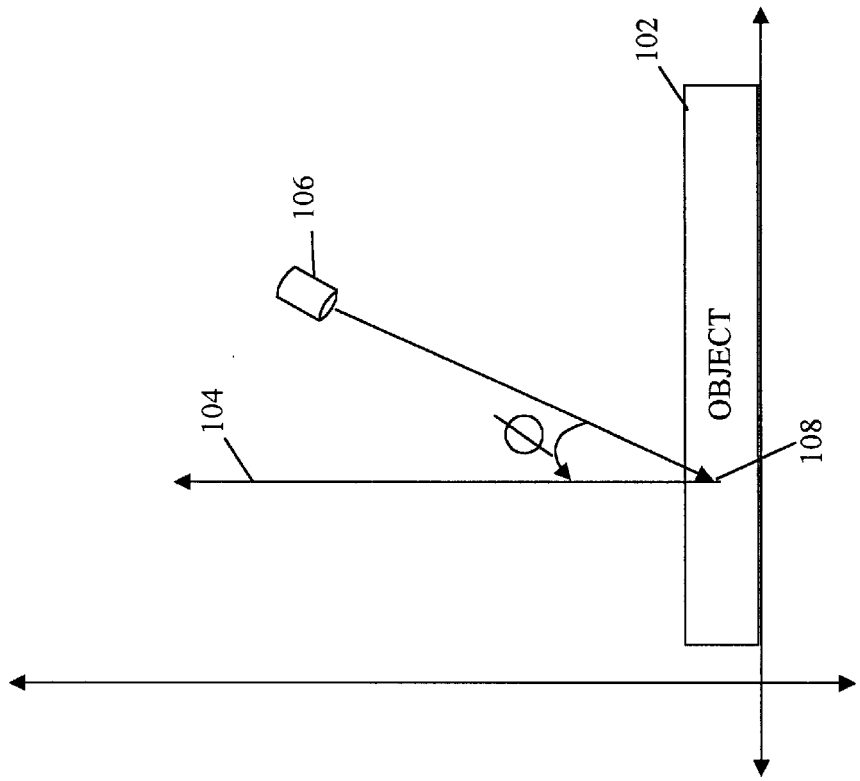
FIGS. 6A and 6B illustrate the computation of the illumination scale factor.
Figure 6B:
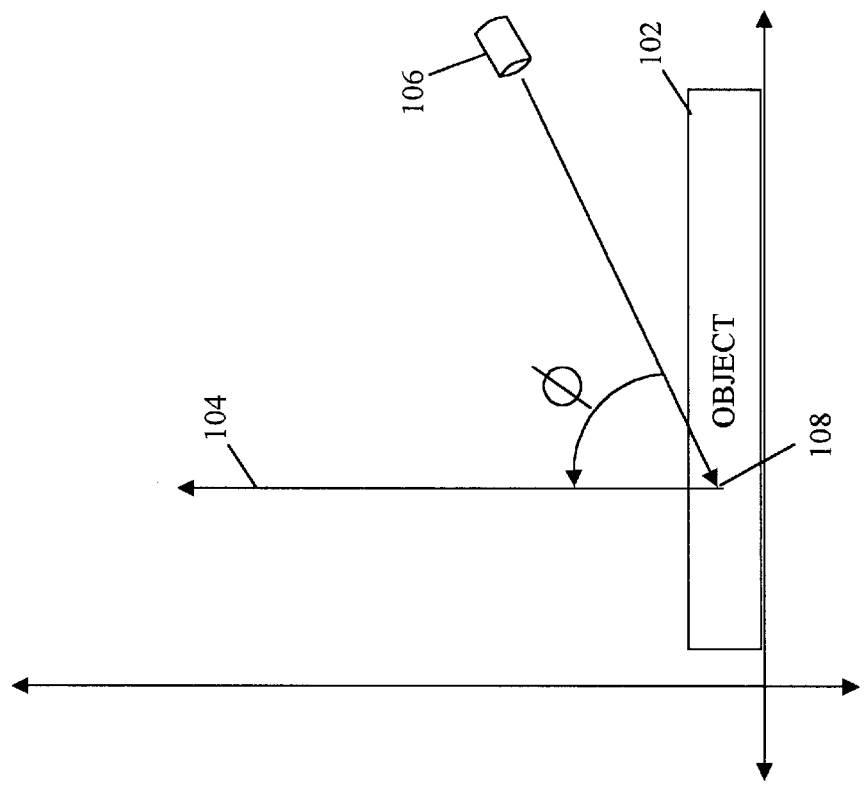

To further illustrate the dot product terms, brief reference is made to FIGS. 6A and 6B. This concept is illustrated in two dimensional space by an object 102 having a normal vector 104 and an angle φ to a light source 106. It will be appreciated that the lighting intensity or scale factor at vertex 108 is greater in the embodiment of FIG. 6B, where the angle φ is smaller, than it is in FIG. 6A.

Returning to the lighting equation, the summation of the various lighting product terms is multiplied by the scale factor $Sf_1$ to generate an intermediate result. This result is then computed in a summation for each of n light sources in a particular scene. Once all the light sources have been accounted for the result of the summation is then added to a global ambient and a material emissivity component, to arrive at the color for a particular vertex. Again, it is understood that this calculation is repeated for each of the red, green and blue lighting components. It has been recognized through practice that, for the vast majority of graphic applications, the lighting properties do not rapidly change.

That is, for a particular graphics scene, lighting properties for the various light sources generally do not change, nor does the lighting properties of the material of objects within the scene. More specifically, unless a light source in a scene is turned on or off, or changes colors, generally, the changes in a scene are shading or intensity changes that are a function of the scale factor, due to an object's relative movement within the scene. As a result, it has been recognized that many of the individual product terms of the lighting equations are the same for repeated calculations for various primitive vertexes that make up a graphic image. Furthermore, it has been recognized that, all told, this accounts for significant allocation of both time and processing resources.

The present invention exploits this recognition by minimizing, where possible, this graphical computation. The way that the preferred embodiment has elected to achieve this efficiency gain is by computing the product terms, and also the summation term of the material of emissivity and the global ambient, a single time, and then to store those processed results in memory. Rather than recalculating these individual terms time after time, the invention, instead, retrieves them from memory, and utilizes them in processing the remainder of the equation. It is only upon the change of one or more of these lighting or material properties that the present invention recalculates these terms.

To quantify the efficiency gains achieved by this realization, in accordance with the architecture of the preferred embodiment, each addition and each multiply step requires two states or two clock cycles. The retrieval of preprocessed information that has been stored into memory is achieved instantaneously (while this retrieval takes some real amount of time, it is effectively achieved instantaneously by virtue of employing look ahead logic to go out and retrieve the processed values before they are actually needed).

Since there are four product terms that are calculated in the lighting equation, and the one summation term (Me+ Ga*Ma) that accounts for a total of ten states which may be saved, per lighting source. Moreover, the fact that each of these terms are computed for each lighting component, (i.e., red, green, and blue), results in a savings of 30 states per lighting source. Over time, and through the calculation of numerous vertices, a tremendous time savings and efficiency is realized by the present invention.

Figure 3:
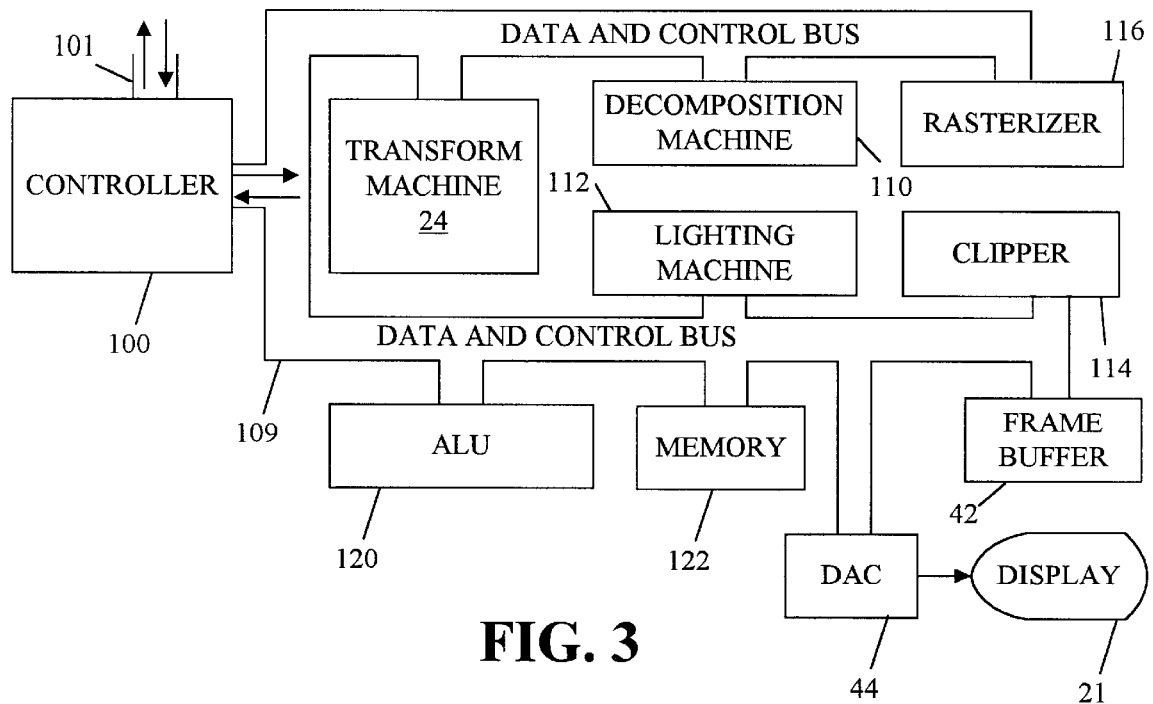
FIG. 3 is a block diagram of the geometry accelerator that illustrates various computational state machines and physical interconnections between the components.
Figure 4:
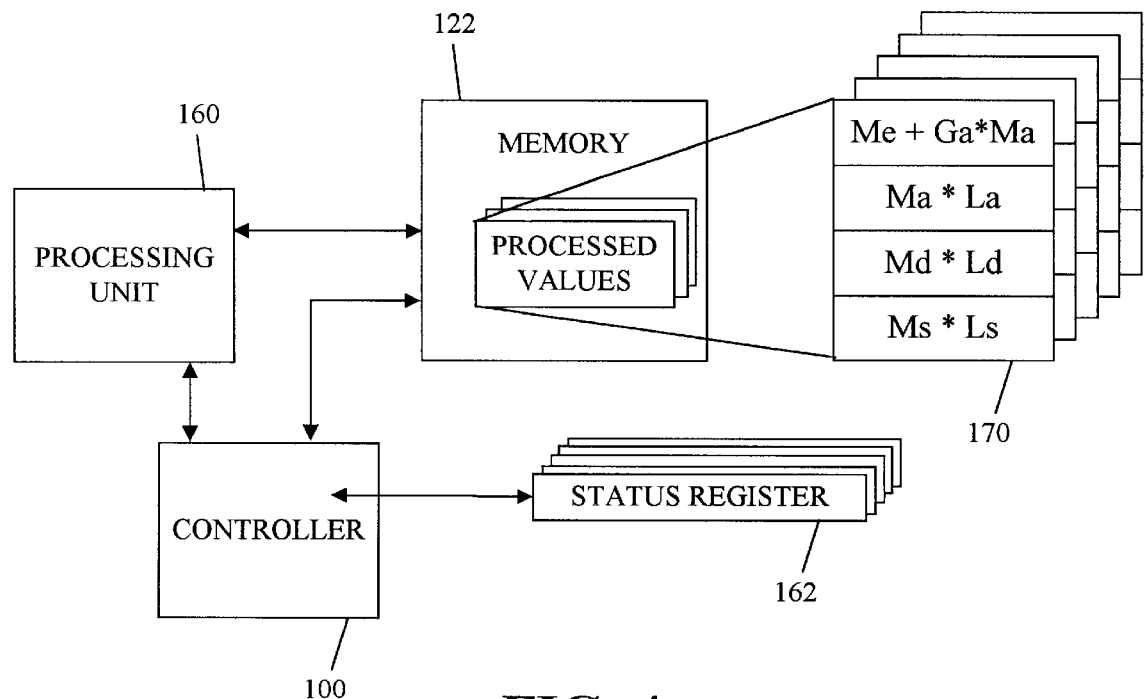
FIG. 4 is a block diagram illustrating the principal functional components of the lighting machine constructed in accordance with a preferred embodiment of the present invention.

Having described the inventive aspects in broad terms, reference is now made to FIGS. 3 and 4, which better illustrate the preferred implementation of the present invention. While FIG. 2 illustrates a functional block diagram of the principal components in the graphics pipeline, FIG. 3 is a block diagram illustrating a more physical (as opposed to functional) layout of the pipeline. Specifically, the graphics accelerator chip includes a controller 100 that communicates with the CPU 12 (see FIG. 1) across a channel 101. The controller 100 communicates with the various state machines, internal memory 122 arithmetic logic unit (ALU) 120 and other devices by way of a data and control bus 109. More specifically, the transform state machine 24, decomposition state machine 110, lighting state machine 112, and clipper state machine 114 are all in communication with the controller 100 and each other by way of data and control bus 109. FIG. 3 also illustrates that the rasterizer 116, frame buffer 142, and digital to analog converter (DAC) 44 are also in communication across the same bus. It will be appreciated that, consistent with the concepts and teachings of the present invention, these devices may be implemented external to the geometric accelerator chip, and therefore are in communication with the chip via a separate control path.

Referring now to FIG. 4, the principal components of the present invention are shown. Specifically, these components include a controller 100, a processing unit 160, memory 122, and a status register 162. In this regard, the memory 122 and controller 100 are assumed to be the same as those illustrated in FIG. 3. The processing unit 160, however, comprises at least a portion of the lighting machine 112 and the arithmetic logic unit 120 of FIG. 3. Consistent with the previous discussion, the present invention operates by processing certain component values of the lighting equation, and storing these values in memory 122. The values that are preprocessed, are the sum of the material emissivity (Me) and the global ambient times the material ambient(Ga*Ma). The preprocessed values also include the product of the material ambient (Ma) and the lighting ambient (La), the product of the material diffuse (Md) and the lighting diffuse (Ld) and the product of the material specular (Ms) and the lighting specular (Ls). As a general rule, once these values are calculated a first time, they are stored in memory 122, where they may be retrieved by the controller 100 and processing unit 160 without further recalculation. Instead, recalculation is needed only if any of the lighting parameters (material emissivity, material ambient, material diffuse, material specular, global ambient, lighting ambient, lighting diffuse, or lighting specular) change. The evaluation or determination as to whether any of these values has changed is made by looking to a status register 162.

In accordance with the preferred embodiment, lighting parameters are transmitted by the CPU into the graphics accelerator through the controller 100, and stored in particular designated locations in memory 122. Table 1 shows the memory address of the various lighting parameters, as implemented in accordance with the preferred embodiment.

TABLE 1

| Address | Description |
|---|---|
| 0x000–0x007 | Light 0 through Light 7 Ambient Red |
| 0x008–0x00F | Light 0 through Light 7 Ambient Green |
| 0x010–0x017 | Light 0 through Light 7 Ambient Blue |
| 0x018–0x01F | Light 0 through Light 7 Diffuse Red |
| 0x020–0x027 | Light 9 through Light 7 Diffuse Green |
| 0x028–0x02F | Light 0 through Light 7 Diffuse Blue |
| 0x030–0x037 | Light 0 through Light 7 Specular Red |
| 0x038–0x03F | Light 0 through Light 7 Specular Green |
| 0x040–0x047 | Light 0 through Light 7 Specular Blue |
| 0x048–0x04F | Light 0 through Light 7 X - Position |
| 0x050–0x057 | Light 0 through Light 7 Y - Position |
| 0x058–0x05F | Light 0 through Light 7 Z Position |
| 0x060–0x067 | Light 0 through Light 7 X - Spot Direction |
| 0x068–0x06F | Light 0 through Light 7 Z - Spot Direction |
| 0x070–0x077 | Light 0 through Light 7 Z - Spot Direction |
| 0x078–0x07F | Light 0 through Light 7 Spot Exponent (floating point) |
| 0x300–0x302 | Vertex0 Front Material Ambient (R, G, B) |
| 0x303– | Vertex 0 Front Material Diffuse (R, G, B) |

TABLE 1-continued

| Address | Description |
|---|---|
| 0x305 | |
| 0x306–0x308 | Vertex0 Front Material Specular (R, G, B) |
| 0x309–0x30B | Vertex0 Front Material Emission (R, G, B) |
| 0x30C | Vertex0 Front Material Specular Threshold |
| 0x30D | Vertex0 Front Material Shininess (floating point) |
| 0x30E | Vertex0 Front Material Shininess (integer - storage really in control) |
| 0x30F | Vertex0 Front Material Alpha |
| 0x310–0x312 | Vertex Front Material Ambient (R, G, B) |
| 0x313–0x315 | Vertex1 Front Material Diffuse (R, G, B) |
| 0x316–0x318 | Vertex1 Front Material Specular (R, G, B) |
| 0x319–0x31B | Vertex1 Front Material Emission (R, G, B) |
| 0x31C | Vertex1 Front Material Specular Threshold |
| 0x31D | Vertex1 Front Material Shininess (floating point) |
| 0x31E | Vertex1 Front Material Shininess (integer - storage rally in control) |
| 0x31F | Vertex1 Front Material Alpha |
| 0x320–0x322 | Vertex2 Front Material Ambient (R, G, B) |
| 0x323–0x325 | Vertex2 Front Material Diffuse (R, G, B) |
| 0x326–0x328 | Vertex2 Front Material Specular (R, G, B) |
| 0x329–0x32B | Vertex2 Front Material Emission (R, G, B) |
| 0x32C | Vertex2 Front Material Specular Threshold |
| 0x32D | Vertex2 Front Material Shininess (floating point) |
| 0x32E | Vertex2 Front Material Shininess (integer - storage rally in control) |
| 0x32F | Vertex2 Front Material Alpha |
| 0x330–0x332 | Vertex3 Front Material Ambient (R, G, B) |
| 0x333–0x335 | Vertex3 Front Material Diffuse (R, G, B) |
| 0x336–0x338 | Vertex3 Front Material Specular (R, G, B) |
| 0x339–0x33B | Vertex3 Front Material Emission (R, G, B) |
| 0x33C | Vertex3 Front Material Specular Threshold |
| 0x33D | Vertex3 Front Material Shininess (floating point) |
| 0x33E | Vertex3 Front Material Shininess (integer - storage rally in control) |
| 0x33F | Vertex3 Front Material Alpha |
| 0x340–0x342 | Vertex0 Back Material Ambient (R, G, B) |
| 0x343–0x345 | Vertex0 Back Material Diffuse (R, G, B) |
| 0x346–0x348 | Vertex0 Back Material Specular (R, G, B) |
| 0x349–0x34B | Vertex0 Back Material Emission (R, G, B) |
| 0x34C | Vertex Back Material Specular Threshold |
| 0x34D | Vertex0 Back Material Shininess (floating point) |
| 0x34E | Vertex0 Back Material Shininess (integer - storage rally in control) |
| 0x34F | Vertex0 Back Material Alpha |
| 0x350–0x352 | Vertex1 Back Material Ambient (R, G, B) |
| 0x353–0x355 | Vertex1 Back Material Diffuse (R, G, B) |
| 0x356–0x358 | Vertex1 Back Material Specular (R, G, B) |
| 0x359–0x35B | Vertex1 Back Material Emission (R, G, B) |
| 0x35C | Vertex Back Material Specular Threshold |
| 0x35D | Vertex1 Back Material Shininess (floating point) |
| 0x35E | Vertex1 Back Material Shininess (integer - storage rally in control) |
| 0x35F | Vertex1 Back Material Alpha |
| 0x360–0x362 | Vertex2 Back Material Ambient (R, G, B) |
| 0x363–0x365 | Vertex2 Back Material Diffuse (R, G, B) |
| 0x366–0x368 | Vertex2 Back Material Specular (R, G, B) |
| 0x369–0x36B | Vertex2 Back Material Emission (R, G, B) |
| 0x36C | Vertex2 Back Material Specular Threshold |
| 0x36D | Vertex2 Back Material Shininess (floating point) |
| 0x36E | Vertex2 Back Material Shininess (integer - storage rally in control) |
| 0x36F | Vertex2 Back Material Alpha |
| 0x370–0x376 | Vertex3 Back Material Ambient (R, G, B) |
| 0x373–0x375 | Vertex3 Back Material Diffuse (R, G, B) |
| 0x376–0x378 | Vertex3 Back Material Specular (R, G, B) |
| 0x379–0x37B | Vertex3 Back Material Emission (R, G, B) |
| 0x37C | Vertex3 Back Material Specular Threshold |
| 0x37D | Vertex3 Back Material Shininess (floating point) |
| 0x37E | Vertex3 Back Material Shininess (integer - storage rally in control) |
| 0x37F | Vertex3 Back Material Alpha |

As can be seen by reference to Table 1, the lighting parameters of the red, green, and blue lighting components, for each light source (up to a maximum of 8 light sources) are included among the data stored in the memory 122. Also stored into memory are lighting parameters including the material properties for vertices 0–3 of the graphics primitive (e.g., line segment, triangle, quadrilateral, etc.) presently being operated upon. In this regard, the material parameters are included for both front and back facing materials. Preferably, bits within the status register 162 are set by hardware as various lighting and material parameters are read in from the CPU. Specifically, bits within the status register 162 are set only if new lighting parameters have changed from previous lighting parameters. As discussed earlier, since the lighting parameters from light sources typically do not frequently change, the changes that will most commonly be noted will be those reflective of material property changes. Since a particular object may be formed from a relatively large number of graphic primitives, it very often is the result that a relatively large number of vertices are processed consecutively having equal lighting and material properties. In such situations, the various bits of status register 162 are infrequently set.

Figure 5:
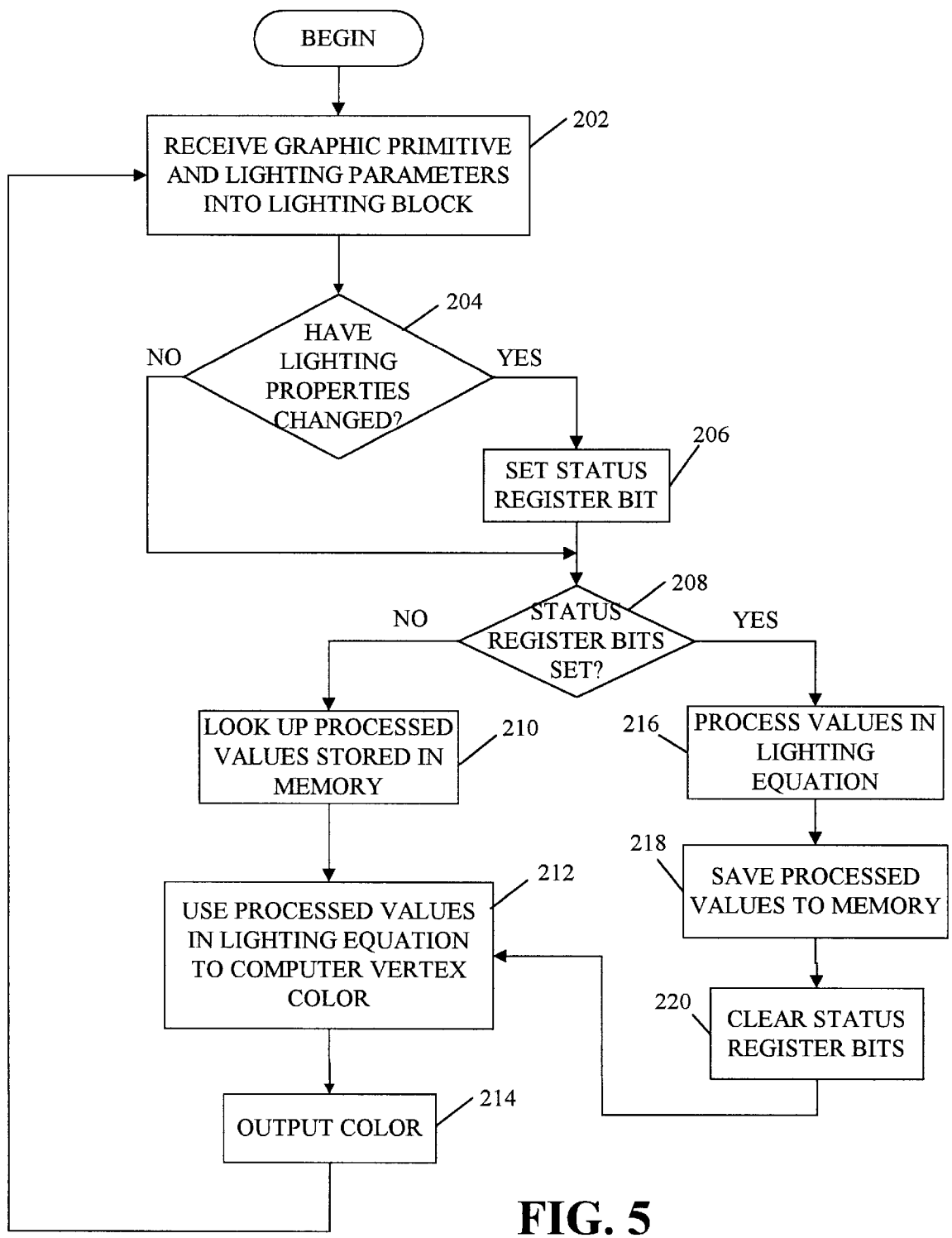
FIG. 5 is a software flowchart illustrating the primary operational steps executed in accordance with the method of the preferred embodiment of the present invention.

As will be better understood in connection in FIG. 5 and the discussion that follows, as the lighting equation is processed for a given vertex, the controller 100 looks to the status register 162. If the status register denotes that one or more bits within the status register 162 are set, then it will control the processing unit to recompute or reprocess the appropriate terms of the lighting equation. If, however, the various bits of the status register 162 are not set, then the controller 100 will recognize that the lighting and material parameters have not changed since the time in which they were previously processed. Accordingly, the controller 100 will instruct a processing unit 160 to calculate the lighting equation by retrieving the appropriate preprocessed terms from memory 122. This results in tremendous efficiency gain and the computation of the lighting equation, and thus in the image presentation on a graphics display 21.

The processed values of the various terms in the lighting equation are illustrated in FIG. 4 as comprising a two-dimensional array of terms. It will be appreciated that, for purposes of the broad concepts of the present invention, the values need not be stored in a two-dimensional array. Indeed, the particular terms that are stored may be varied dependent upon the particular implementation and design factors sought to be obtained. However, in accordance with one embodiment of the present invention, the terms illustrated may be stored repeatedly for each lighting component (i.e. red, green and blue), as well as for each light source. In similar fashion, the status register 162 has been depicted in FIG. 4 as an array of registers. In this regard, the invention may employ a single status register, or alternatively may utilize a plurality of status registers for each red, green and blue component, and for each light source. The particular layout of one half of the status register 162 utilized in the preferred embodiment is depicted in Table 2 below.

TABLE 2

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| Front Material ||||||||||||||||
| Vertex 3 |||| Vertex 2 |||| Vertex 1 |||| Vertex 0 ||||
| e | a | d | s | e | a | d | s | e | a | d | s | e | a | d | s |

The preferred register is a 32 bit register wherein 16 bits are directed to the front material properties (Table 2), while the remaining 16 bits are directed to the back facing material properties. Thus, a complete status register 162 would be a duplicate of Table 2, with the remaining sixteen bits defining back facing material properties. For each of the 16 bits directed to either the front or back facing material properties, each portion is further subdivided into four groups, for the up to four vertices for the presently operative graphic primitive.

For each vertex, the status register contains a bit for the material specular component (Ms), the material diffuse component (Md), the material ambient component (Ma), and the material emissivity component (Me). If any of these material properties of lighting properties have changed from the prior value submitted to memory from the previous graphic primitive, then the appropriate bit in the status register 162 is set. As previously discussed, if the controller 100 detects a set bit, it then instructs the processing unit 160 to recompute the appropriate lighting equation values that will be effected by the changed or new material property. Once the new values are processed, the relevant and appropriate bits in the status register 162 are cleared.

Turning now to FIG. 5, a top level operational flow chart is illustrated. Broadly, the controller 100 receives graphic primitive and lighting parameters from the CPU 12 and writes these values into memory 122 (step 202). The system then checks to determine whether any of the lighting properties have changed from the previous graphic primitive operated upon (step 204). If so, the system sets the appropriate status register bits (step 206). Thereafter, it proceeds to step 208 where the controller 100 looks to see whether status register bits are set. It will be appreciated that an independent hardware mechanism is used to set the status register bits, so that they may be set at the same time they read into memory 122. For purposes of simplification, this has been illustrated as a separate consecutive step in the flow chart, but in practice it occurs concurrently. If no status register bits are set, then the system retrieves preprocessed values that are stored in memory 122 (step 210). The system then uses these preprocessed values in calculating the lighting equation (step 212). After computing the lighting equation, the system may then output to the digital to analog converter 44 and display 21 the appropriate pixel color (step 214).

Alternatively, if one or more of the status register bits are set, then the controller 100 controls the processing unit 160 to reprocess the appropriate terms of the lighting equation (step 216). Thereafter, the reprocessed lighting equation terms are saved to memory 122 (step 218) and the status register bits are cleared (step 220). Thereafter, the system may proceed to step 212 and continue processing as described above.

While the foregoing has given a basic description of image generation and primitive manipulation in a graphics acceleration, it should be appreciated that many areas have been touched upon only briefly, for purposes of illustrating the invention herein. A more complete and detailed understanding will be appreciated by those skilled in the art, and is accessible from readily-available sources. For example, the graphics accelerator of the presently preferred embodiment is designed for operation in systems that employ OpenGL, which is a well known graphics application program interface (API). Indeed, there are many references which provide a more detailed understanding of graphics generally, and OpenGL specifically. One such reference is entitled OpenGL Programming Guide, by OpenGL Architecture Review Board—Jackie Neider, Tom Davis, and Mason Woo, an Addison-Wesley Publishing Company, 1993, which is hereby incorporated by reference.

As a final note, the preferred embodiment of the present invention is implemented in a custom integrated circuit, which serves as a single-chip geometry and lighting assist for a focused set of 3D primitives. Although the discussion above has focused upon triangle primitives, the chip performs geometric transformation, lighting, depth cue, and clipping calculations for quadrilaterals, triangles, and vectors. This chip receives modeling coordinate polygon and vector vertices from a host CPU 12, transforms vertex coordinates into screen space, determines vertex colors, decomposes quadrilaterals into triangles, and computes the triangle plane equations. It also performs 3D view clipping on the transformed primitives before sending the resulting triangles and vectors to a scan converter for rendering.

This custom integrated circuit supports many combinations of primitives and features, but as will be appreciated, when an application program uses an unusual feature, much of the computational work falls back on the host software. In those cases, the graphics pipeline is implemented in software and commands for the scan converter are passed through the custom integrated circuit. Alternatively, the software may supply device coordinate primitives to the custom integrated circuit to take advantage of its internal hardware that performs the plane equation work for the downstream scan conversion hardware.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

what is claimed is:

1. A method for computing the color of a plurality of vertices of one or more graphic primitives in a graphics accelerator, comprising the steps of:
   (a) receiving lighting properties of a primitive vertex;
   (b) determining whether predetermined lighting properties of the vertex are the same as a previously computed vertex;
   (c) executing steps (i) and (ii), if the predetermined lighting properties are the same as the previously computed vertex;
      (i) retrieving at least one preprocessed value from a storage location; and
      (ii) utilizing the at least one preprocessed value to compute the vertex color;
   (d) executing steps (iii) through (v), if the predetermined lighting properties are not the same as the previously computed vertex;
      (iii) computing at least one preprocessed value from the received lighting properties of the primitive vertex;
      (iv) storing the at least one computed preprocessed value in a storage location; and
      (v) utilizing the at least one preprocessed value to compute the vertex color.

2. The method as defined in claim 1, wherein the lighting properties includes one or more selected from the group consisting of:
   global ambient color;
   material emission color;
   material ambient color;
   material diffuse color;
   material specular color;
   lighting ambient color;
   lighting diffuse color; and
   lighting specular color.

3. The method as defined in claim 2, wherein the one or more selected properties includes red, green, and blue components.

4. The method as defined in claim 1, wherein the computing steps of steps (ii) and (v) includes computing one or more values that form the following equation:

$$\text{vertexcolor} = (Me + Ga*Ma) + \Sigma^n(Sf_1)*(Ma*La + Sf_2*Md*Ld + Sf_3*Ms*Ls);$$

wherein Me is a material emissivity, Ga is a global ambient, Ma is a material ambient component, La is a lighting ambient component, Md is a material diffuse component, Ld is a lighting diffuse component, Ms is a material specular component, Ls is a lighting specular component, n is a number of light sources, and $Sf_1$, $Sf_2$, and $Sf_3$ are scale factors.

5. The method as defined in claim 4, wherein the storing step (iv) stores one or more of the computed preprocessed values selected from the group consisting of:
   an emissivity color component (Me+Ga*Ma);
   an ambient color component (Ma*La);
   a diffuse color component (Md*Ld); and
   a specular color component (Ms*Ls).

6. The method as defined in claim 1, wherein the storing step (vi) includes the step of updating a status register.

7. The method as defined in claim 6, wherein the determining step (b) includes the step of evaluating the state of the status register.

8. A system for increasing speed in a geometry accelerator for a computer graphics system, comprising:
   at least one processing unit for performing mathematical operations on lighting properties of a vertex of a graphics primitive;
   a storage area for storing predetermined values processed by the processing unit;
   receiving means configured to receive at least two lighting properties defining a primitive vertex;
   lighting property comparator configured to compare the at least two lighting properties with previously received lighting properties to determine whether they are the same; and
   a controller adapted to control the storage and retrieval of values from the storage area and the processing unit, the controller including storage control means responsive to the lighting property comparator configured to save newly processed vertex color values in the operational storage register and to retrieve preprocessed values from the storage area.

9. The system as defined in claim 8, wherein the at least one processing unit includes an arithmetic logic unit (ALU).

10. The system as defined in claim 8, further including a status register having contents indicative of the values stored in the storage area.

11. The system as defined in claim 10, wherein the status register is a thirty-two bit register.

12. The system as defined in claim 10, wherein the values stored in the status register include one or more status bits indicative of lighting values selected from the group consisting of:
   an emissivity and global ambient color components;
   an ambient color component;
   a diffuse color component; and
   a specular color component.

13. The system as defined in claim 12, wherein the lighting property comparator includes a status register controller adapted to set and reset status register bits, based upon the variance of lighting properties for successively processed vertices.

14. The system as defined in claim 12, wherein each of the status bits are replicated for a plurality of primitive vertices.

15. The system as defined in claim 8, wherein the receiving means receives lighting properties generated outside the geometry accelerator.

16. The system as defined in claim 8, wherein the at lighting properties includes one or more selected from the group consisting of:

global ambient color;
material emission color;
material ambient color;
material diffuse color;
material specular color;
lighting ambient color;
lighting diffuse color; and
lighting specular color.

17. The system as defined in claim 16, wherein the processing unit further includes means for computing color values.

18. The system as defined in claim 17, wherein the color values are computed in accordance with one or more of the equations selected from the group consisting of:

an emissivity color component=material emissivity color+a global ambient color*material ambient;

an ambient color component=material ambient color*lighting ambient color;

a diffuse color component=material diffuse color*lighting diffuse color; and a specular color component=material specular color*lighting specular color.

19. A computer readable storage medium containing program code for computing the color of a plurality of vertices of one or more graphic primitives in a graphics accelerator, comprising the steps of:

(a) receiving lighting properties of the primitive vertex;

(b) determining whether predetermined lighting properties of the vertex are the same as the previously computer vertex;

(c) executing steps (i) and (ii), if the predetermined lighting properties are the same as the previously computed vertex;

(i) retrieving at least one preprocessed value from a storage location; and (ii) utilizing the at least one preprocessed value to compute the vertex color;

(d) executing steps (iii) through (v), if the predetermined lighting properties are not the same as the previously computed vertex;

(iii) computing at least one preprocessed value from the received lighting properties of the primitive vertex;

(iv) storing the at least one computed preprocessed value in a storage location; and (v) utilizing the at least one preprocessed value to compute the vertex color.

20. The computer readable storage medium as defined in claim 19, wherein the at lighting properties includes one or more selected from the group consisting of:

global ambient color;

material emission color;

material ambient color;

material diffuse color;

material specular color;

lighting ambient color;

lighting diffuse color; and lighting specular color.

* * * * *

UNITED STATES PATENT AND TRADEMARK OFFICE
CERTIFICATE OF CORRECTION

PATENT NO. : 5,956,042
DATED : September 21, 1999
INVENTOR(S) : S. Paul Tucker and Alan S. Krech, Jr.

It is certified that error appears in the above-identified patent and that said Letters Patent is hereby corrected as shown below:

Column 11,
Lines 23, 33, 35, 46 and 57, "storage rally" should read -- storage really --

Column 12,
Lines 6, 18 and 29, "storage rally" should read -- storage really --
Line 21, "0x376" should read -- 0x372 --

Column 13,
Lines 53, "effected" should read -- affected --

Signed and Sealed this

Twenty-eighth Day of May, 2002

Attest:

JAMES E. ROGAN
Attesting Officer
Director of the United States Patent and Trademark Office